UNITED STATES PATENT OFFICE.

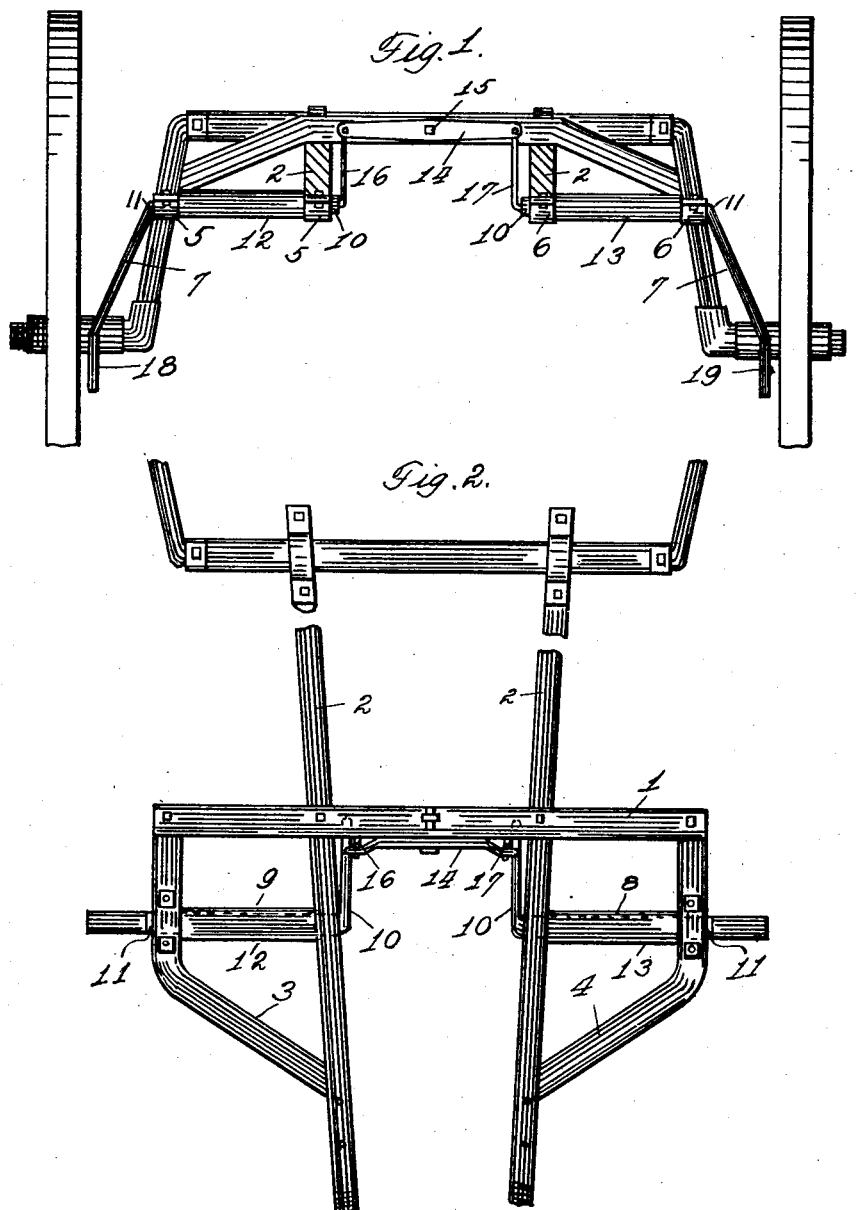

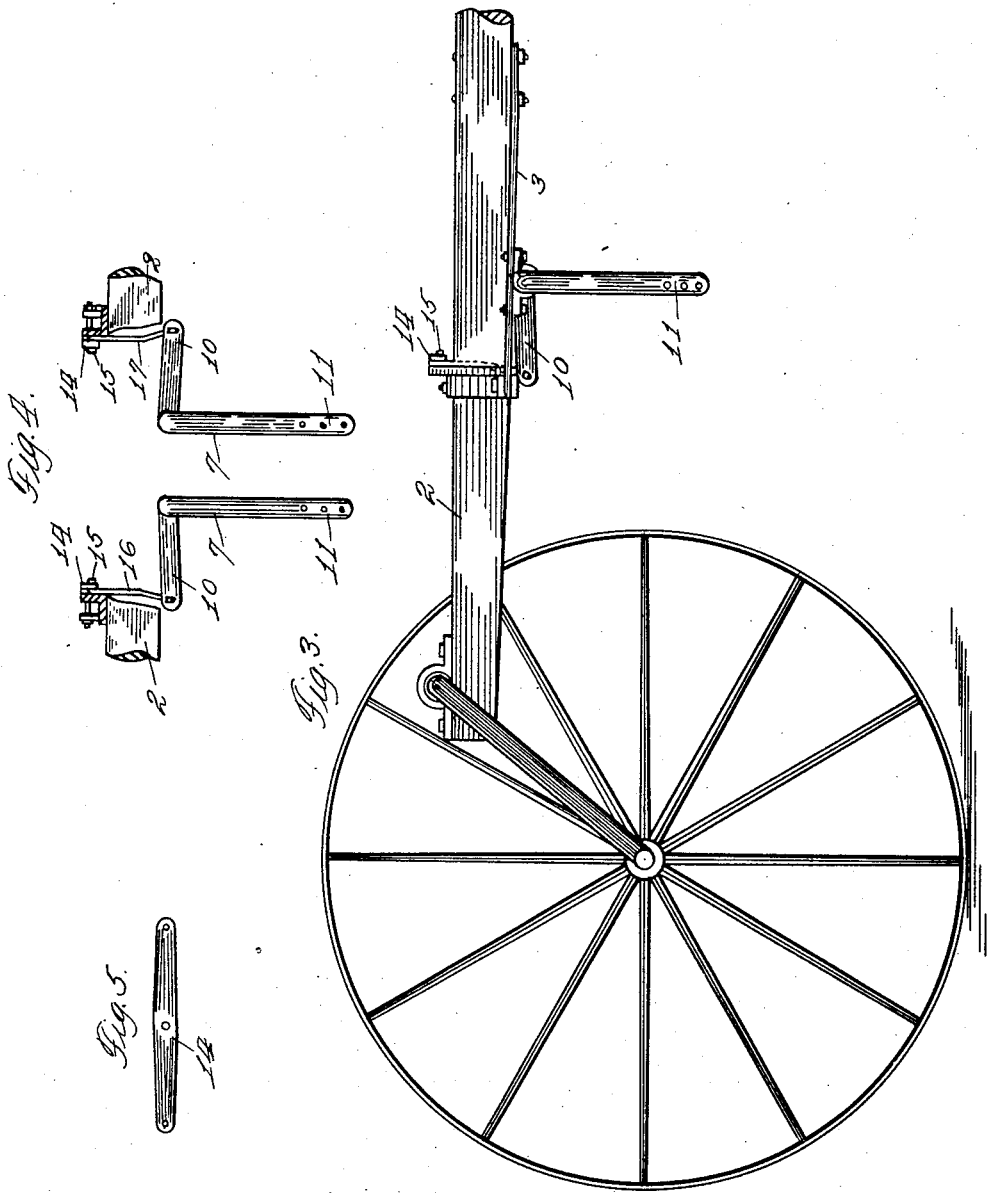

JOHN M. WRIGHT, OF BRAINARD, NEBRASKA.

DRAFT-EQUALIZING DEVICE.

1,033,365.          Specification of Letters Patent.      Patented July 23, 1912.

Application filed July 26, 1909. Serial No. 509,735.

*To all whom it may concern:*

Be it known that I, JOHN M. WRIGHT, a citizen of the United States of America, residing at Brainard, in the county of Butler and State of Nebraska, have invented certain new and useful Improvements in Draft-Equalizing Devices, of which the following is a specification.

My invention relates to a draft equalizing device and is particularly adapted to be used with agricultural implements or the like in which an extreme throw of the equalizer bar is desirable.

The objects of my invention are to provide a simple and efficient hitching device which provides means for an extreme throw to compensate for any irregularity in the draft of the machine or position of the horses.

Having these and other objects in view, my invention is illustrated in the accompanying drawings in which:

Figure 1 is a front end elevation of my hitching device showing the connections with the equalizer bar. Fig. 2 is a plan view of the hitching device showing the means of attaching it to a twin pole, the frame and also the means of attaching the equalizer bar to the frame. Fig. 3 is a side elevation of my hitching device. Fig. 4 is a detail of the links and hitch bars. Fig. 5 is another detail of the equalizer bar.

In the drawings, reference numeral 1 represents a part of the frame or beam, the ends of which extend laterally on each side of the pole and downward at an inclination on each side of the pole. The beam 1 is rigidly secured to the pole members 2—2. One end of the braces 3 and 4 are secured to the ends of the beam 1 and the opposite ends of the braces are securely bolted to each of the pole members 2—2. Bearings 5 and 6 are secured to the bottom of the pole members and also to the bottom of the braces. This construction provides a frame upon which the parts of the hitch bars 7 are pivotally mounted being journaled in the bearings 5 and 6 at their body portions 8 and 9. The free ends of the hitch bars are bent substantially at right angles to the body portions 8 and 9, as shown at the points indicated by reference numerals 10—10—11 and 11. Sleeves 12 and 13 are interposed between the pole members 2—2 and the braces and bearings as shown in Fig. 2. The body portions 8 and 9 of the hitch bars pass through said sleeves. An equalizing bar 14 is pivotally attached to the beam 1 by the bolt 15.

Apertures are provided in each end of the equalizing bar and the hooked portion of one end of the links 16 and 17 inserted therein. The opposite ends of the links are inserted in apertures provided in the turned ends 10—10 of the hitch bars thereby making a pivotal connection between the equalizing bar and the hitch bars. The ends 18 and 19 of the hitch bars have suitable apertures provided therein for the purpose of providing means of hitching thereto but it is obvious that any suitable means can be used for this purpose.

Having fully described my invention, what I claim and desire to secure by Letters Patent is:

1. The combination of a hitching device and a draft equalizer mounted on a frame, comprising two hitch bars having both ends of each hitch bar bent substantially at right angles to the body portion and in a vertical and horizontal direction with relation to each other, said body portions being journaled on the frame, a vertically operating equalizing bar pivotally attached to the frame, and links to connect said equalizing bar to one end of each hitch bar.

2. In a draft equalizer, the combination of a frame comprising two hitch bars having both ends of each hitch bar bent substantially at right angles to the body portion and in a vertical and horizontal direction with relation to each other, said hitch bars being mounted on the frame to permit the oscillation of the bent ends of the hitch bars in a vertical direction, a vertically operating equalizing bar pivoted to the frame and means to pivotally connect the bent ends of the hitch bars and the ends of the vertically operating equalizing bar as described and set forth.

In testimony whereof I affix my signature in presence of two witnesses.

JOHN M. WRIGHT.

Witnesses:
     G. N. HYPSE,
     A. O. KLEIN.

---

Copies of this patent may be obtained for five cents each, by addressing the "Commissioner of Patents, Washington, D. C."